(12) United States Patent
Yokoyama (10) Patent No.: US 9,007,685 B2
(45) Date of Patent: Apr. 14, 2015

(54) POLARIZATION SEPARATION DEVICE AND DISPLAY APPARATUS

(71) Applicant: Seiko Epson Corporation, Tokyo (JP)

(72) Inventor: Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 13/674,239

(22) Filed: Nov. 12, 2012

(65) Prior Publication Data

US 2013/0135722 A1 May 30, 2013

(30) Foreign Application Priority Data

Nov. 29, 2011 (JP) ................. 2011-259917

(51) Int. Cl.
  *G02B 27/26* (2006.01)
  *G02B 27/22* (2006.01)
  *G02B 27/24* (2006.01)
  *G02B 27/28* (2006.01)
  *G02B 27/01* (2006.01)

(52) U.S. Cl.
  CPC .............. *G02B 27/26* (2013.01); *G02B 27/283* (2013.01); *G02B 2027/0132* (2013.01); *G02B 27/0172* (2013.01)

(58) Field of Classification Search
  None
  See application file for complete search history.

(56) References Cited

U.S. PATENT DOCUMENTS

| 6,747,611 | B1 | 6/2004 | Budd et al. |
| 7,553,024 | B2 * | 6/2009 | Ouchi et al. ................... 353/20 |
| 2005/0219152 | A1 | 10/2005 | Budd et al. |
| 2009/0231687 | A1 | 9/2009 | Yamamoto |
| 2011/0211260 | A1 | 9/2011 | Yamamoto |

FOREIGN PATENT DOCUMENTS

| JP | 8-211326 A | 8/1996 |
| JP | 9-146046 A | 6/1997 |
| JP | 2001-177785 A | 6/2001 |
| JP | 2002-116409 A | 4/2002 |
| JP | 2009-244869 A | 10/2009 |

* cited by examiner

*Primary Examiner* — Jade R Chwasz
(74) *Attorney, Agent, or Firm* — ALG Intellectual Property, LLC (57) ABSTRACT

A polarization separation device includes a first end surface on which incident light is incident, a polarization separation surface that reflects an s-polarized light component and transmits a p-polarized light component, a second end surface that is arranged to be opposed to the first end surface, converts the p-polarized light component transmitted through the polarization separation surface to the s-polarized light component, and reflects the converted light component to an optical axis direction which is the same as the incident light, a third end surface from which the s-polarized light component reflected by the polarization separation surface without transmitting through the polarization separation surface is output, and a fourth end surface that is arranged to be opposed to the third end surface and from which the s-polarized light component reflected by the second end surface and the polarization separation surface is output.

14 Claims, 9 Drawing Sheets

FIG. 9

POLARIZATION SEPARATION DEVICE AND DISPLAY APPARATUS

BACKGROUND

1. Technical Field

The present invention relates to a polarization separation device that distributes polarized light components of incident light to two directions which are different from the incident direction, and a display apparatus including the polarization separation device.

2. Related Art

An existing head mount-type display apparatus called a head-mount display (HMD) has been developed. In the head mount-type display apparatus, images are displayed in the following manner. That is, optical images are formed by display devices such as liquid crystal panels or organic EL panels installed in front of the eyes of an observer and the optical images are enlarged through optical systems having eyepieces, half mirrors, and the like to be focused in front of the eyes of the observer.

In general, as the HMD, a binocular HMD is employed (for example, see JP-A-2009-244869). In the binocular HMD, an observer is made to observe images displayed on two image display devices forming a left and right pair with both eyes. When the binocular HMD is mounted on the observer, the observer can observe the right and left display images as one image in a superimposed manner.

However, the HMD as disclosed in JP-A-2009-244869 includes the two display panels. Therefore, the number of parts and the assembly man-hours are increased and the manufacturing cost is increased. Further, there is also a problem that design of the display devices and right and left optical systems is made complicated for ensuring installation places of the two display panels.

SUMMARY

An advantage of some aspects of the invention is to provide a polarization separation device and a display apparatus that provide images to both eyes by using one display panel only and reduce the number of parts and the assembly man-hours so as to reduce the manufacturing cost, make the internal design easier, and reduce the devices in size.

A polarization separation device according to an aspect of the invention includes a first end surface on which incident light is incident, a polarization separation surface that reflects an s-polarized light component with a predetermined polarization azimuth in the incident light, and makes a p-polarized light component with a polarization azimuth which is different from the predetermined polarization azimuth transmit, a second end surface that is arranged to be opposed to the first end surface, and converts the p-polarized light component transmitted through the polarization separation surface to the s-polarized light component, reflects the converted light component to an optical axis direction which is the same as the incident light, a third end surface from which the s-polarized light component reflected by the polarization separation surface without transmitting through the polarization separation surface is output, and a fourth end surface that is arranged to be opposed to the third end surface and from which the s-polarized light component reflected by the second end surface and the polarization separation surface is output.

With the polarization separation device according to the aspect of the invention, the light incident from the first end surface can be made to be output from the third end surface and the fourth end surface in accordance with the polarization azimuths thereof and the polarization components of the incident light can be distributed to two directions which are different from the incident direction. As a result, according to the aspect of the invention, two video images with different polarization azimuths that are displayed on one display panel can be distributed and provided to the right and left eyes of an observer, for example.

With this, in the aspect of the invention, the number of parts and the assembly man-hours can be reduced so as to reduce the manufacturing cost, make the internal design easier, and reduce the device in size. Further, in this case, if different video images having parallaxes between the right and left eyes are distributed and provided to the right and left eyes of the observer as the two video images with the different polarization azimuths, stereoscopic display can be also realized. It is to be noted that the second end surface can be configured by arranging a ¼ wavelength film on which a metal reflecting film is formed.

It is preferable that the above-described polarization separation device further include an optical path length adjusting member that converts an optical path length of light transmitted through the third end surface. The "optical path length" indicates an optical distance defined by a product nd when the light travels in a medium having a refractive index n along an optical path by a distance d. In this case, the optical path lengths of the light components distributed to the two directions from the light incident surface to the light output surface of the polarization separation device can be made equal to each other. As optical systems which provide enlarged virtual images of the images on the display panel to the right and left eyes, the same lens systems and mirrors can be used for the right and left eyes. As a result, the optical systems can be easily designed such that aberrations and magnifications are equal on the right and left optical systems. With this, the optical systems can provide video images which are easy to be viewed and common parts can be used therefor. Therefore, the number of parts and the assembly man-hours can be reduced so as to reduce the manufacturing cost.

In the above-described polarization separation device, it is preferable that a member from the polarization separation surface to the third end surface be formed integrally with the optical path length adjusting member. In this case, the number of overall parts of the polarization separation device can be reduced so as to further reduce cost. The expression "integrally" encompasses a case where two parts are integrally formed with the same material and a case where two parts made of different materials are bonded to each other so as to be integrally formed.

It is preferable that the above-described polarization separation device further include a transmissivity adjusting filter that changes transmissivity of light to be output from the optical path adjusting member. In this case, intensities of the light components distributed to the two directions can be made equal. As a result, brightness of each of the right and left optical systems can be made equal. This makes it possible to provide video images which can be easy to be viewed.

In the above-described polarization separation device, it is preferable that an optical path length of a light component which transmits through the polarization separation surface, is reflected by the second end surface and the polarization separation surface, and reaches the fourth end surface and an optical path length of a light component which is reflected by the polarization separation surface, transmits through the optical path adjusting member, and reaches an output surface be equal to each other. In this case, aberrations and magnifications are equal on the right and left optical systems. This makes it possible to provide video images which can be more easily viewed.

In the above-described polarization separation device, it is preferable that a member from the first end surface to the polarization separation surface, a member from the polarization separation surface to the second end surface, and the optical path length adjusting member be formed by the same member, and a length of the optical path adjusting member in an optical axis direction be twice as a distance from the polarization separation surface to the second end surface. In this case, the member from the polarization separation surface to the second end surface and the optical path length adjusting member are formed by the same member. With this, the optical path lengths of the light components distributed to the two directions on the polarization separation device from the light incident surface to the light output surface of the polarization separation device can be made equal to each other easily. Therefore, the optical systems can be easily designed and raw materials can be procured easily so as to reduce the manufacturing cost.

A display apparatus according to another aspect of the invention including any one of the above-described polarization separation devices includes a display unit that makes a video image constituted by any one or both of a p-polarized light component with a predetermined polarization azimuth and an s-polarized light component with a polarization azimuth which is different from the p-polarized light component incident on the first end surface as the incident light, and a left-eye light guiding optical system and a right-eye light guiding optical system that enable an observer to observe enlarged virtual images of video images output from the third and fourth end surfaces with right and left eyes, respectively.

It is to be noted that the above-described display unit includes a display panel such as a liquid crystal display on which a video image is displayed, a polarization filter that separates polarized light components contained in the video image, and a polarization separation unit such as a polarization plane rotating element that selectively outputs only a predetermined polarization component.

With the display apparatus, two video images with different polarization azimuths which are displayed on the display unit are distributed to two directions, the distributed video images can be independently provided to the right and left eyes of an observer through the left-eye light guiding optical system and the right-eye light guiding optical system by using the above-described polarization separation device. In this case, if different video images having parallaxes between the right and left eyes are distributed and provided to the right and left eyes of the observer as the two video images with the different polarization azimuths, stereoscopic display can be also realized.

In the above-described display apparatus, it is preferable that the left-eye light guiding optical system and the right-eye light guiding optical system be constituted by the same optical elements. In this case, since common parts can be used, the optical elements and the optical systems can be designed easily and the number of parts and the assembly man-hours can be reduced so as to reduce the device in size and the manufacturing cost.

In the above-described display apparatus, it is preferable that a center position of the display unit be eccentric with respect to a center position between both of the eyes of the observer. In this case, if the center position of the display unit is deviated from a center position of the entire display apparatus, even when the polarization separation device is asymmetrical, installation places of the polarization separation device and the right and left optical systems can be ensured without complicating them, thereby making design thereof easier.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, various embodiments according to the invention are described with reference to the accompanying drawings. It is to be noted that in the drawings, ratios of dimensions of parts are made different from the actual ratios thereof. Further, the embodiments illustrate one mode of the invention and are not intended to limit the invention. The embodiments can be arbitrarily changed in a range of technical spirit of the invention.

Figure 1:
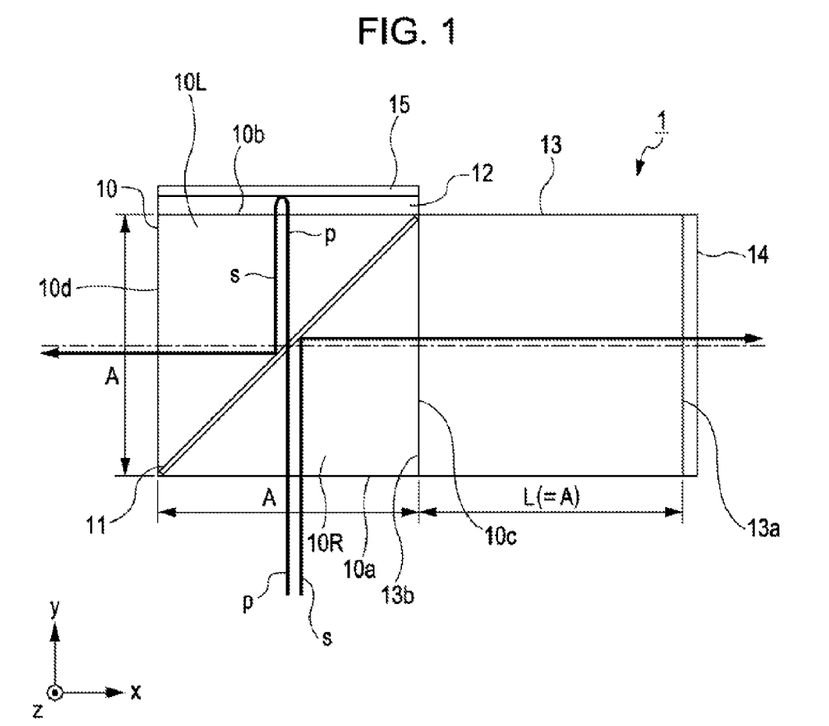
FIG. 1 is a cross-sectional view illustrating a polarization separation device according to a first embodiment of the invention.

FIG. 1 is a cross-sectional view illustrating a schematic configuration of a polarization separation device 1 according to the first embodiment of the invention. As illustrated in FIG. 1, the polarization separation device 1 is a device which distributes polarization components of incident light to two directions which are different from the incident direction. The polarization separation device 1 includes a polarization beam splitter 10, a ¼ wavelength film 12, an optical path length adjusting member 13, and a transmissivity adjusting filter 14.

The polarization beam splitter 10 is a prism which separates a light beam into two polarization components. In the embodiment, the polarization beam splitter 10 is constituted by bonding triangular columnar-shaped prism parts made of a glass 10L and 10R to each other. The polarization beam splitter 10 has a shape of regular hexahedron of which dimension of one side is A. It is to be noted that in the embodiment, the prism parts 10L and 10R are formed with a refractive material having the same refractive index but can be formed with refractive materials having different refractive indices. Further, the polarization beam splitter 10 constituted into the regular hexahedron by bonding the prism parts 10L and 10R to each other includes a first end surface 10a, a second end surface 10b, a third end surface 10c and a fourth end surface 10d. Incident light is incident on the first end surface 10a. The second end surface 10b is arranged to be opposed to the first end surface 10a. A light component of the incident light, which has been reflected by a polarization separation surface, is output from the third end surface 10c. The fourth end surface 10d is opposed to the third end surface 10c.

Further, a polarization separation surface 11 is formed on the polarization beam splitter 10 along a bonded surface between the two prism parts 10L and 10R. As will be described in detail, the prism parts 10L and 10R form triangular columnar-shapes having cross sections of isosceles triangular shapes of which each side has a length of A. The bases of the isosceles triangles form 45° with other two equal sides. The prism parts 10L and 10R are bonded to each other on the side surfaces located on the bases. The bonded surface corresponds to the polarization separation surface 11.

For example, a dielectric multilayer film is formed on the polarization separation surface 11. The polarization separation surface 11 reflects an s-polarized light component with a predetermined polarization azimuth in the incident light and makes a p-polarized light component with a polarization azimuth which is different from the predetermined polarization azimuth therein transmit. With this, in the embodiment, the s-polarized light component in the incident light which has been incident from the first end surface 10a of the polarization beam splitter 10 is reflected by the polarization separation surface 11 without transmitting through the polarization separation surface 11 and is incident on the third end surface 10c. On the other hand, the p-polarized light component in the incident light transmits through the polarization separation surface 11 without being reflected thereby and is incident on the second end surface 10b.

The ¼ wavelength film 12 is provided on the second end surface 10b on which the p-polarized light component is incident. The ¼ wavelength film 12 is a birefringent member which generates phase shift of ¼ wavelength (90°) between linear polarized light components vibrating in the directions orthogonal to each other. In the embodiment, the ¼ wavelength film 12 converts the p-polarized light component transmitted through the polarization separation surface 11 to circular polarized light.

Further, a metal reflecting film 15 is deposited on or is bonded to the ¼ wavelength film 12. The metal reflecting film 15 is made of a metal having high light reflectivity such as aluminum, for example, and reflects the incident light to the same optical axis direction.

With this configuration, the p-polarized light component transmits through the ¼ wavelength film 12 to be converted to the circular polarized light, is converted to circular polarized light with the reversed rotating direction when being reflected by the metal reflecting film 15, and is converted to the s-polarized light component when exiting the ¼ wavelength film 12 again. Then, the reflected s-polarized light component is reflected by the polarization separation surface 11 and is incident on the fourth end surface 10d.

Further, the optical path length adjusting member 13 is provided on the third end surface 10c. The optical path length adjusting member 13 is a member which converts (shortens or lengthens) the optical path length of the light component transmitted through the third end surface 10c. The optical path length adjusting member 13 is formed with a glass at least having the same refractive index as the prism member 10L of the polarization beam splitter 10. In the embodiment, the optical path length adjusting member 13 is formed with the same material as the prism members 10L and 10R. An incident surface 13b of the optical path length adjusting member 13 is bonded to the third end surface 10c so that the optical path length adjusting member 13 is formed integrally with the prism member 10R. Further, the length L of the optical path length adjusting member 13 in the optical axis direction is twice as the distance (A/2) from the polarization separation surface 11 to the second end surface 10b.

In the polarization separation device 1 in which the optical path length adjusting member 13 and the polarization beam splitter 10 having the above-described shapes and members are bonded to each other, the optical path length of the light component which transmits through the polarization separation surface 11, is reflected by the second end surface 10b and the polarization separation surface 11, and then reaches the fourth end surface 10d and the optical path length of the light component which is reflected by the polarization separation surface 11, transmits through the optical path length adjusting member 13, and reaches an output surface 13a are equal to each other.

The optical path length of the s-polarized light component separated on the polarization separation device 1 is described. At first, the length of one side of the polarization beam splitter 10 having the shape of regular hexahedron is assumed to be A. Under the assumption, the p-polarized light component which has been incident on the polarization beam splitter 10 travels to the fourth end surface 10d from which the p-polarized light component is output from the first end surface 10a on which the p-polarized light component is incident by a distance of 2A. Note that if the refractive index of the glass constituting the polarization beam splitter 10 is assumed to be n, the optical path length of the p-polarized light component is n×2A. On the other hand, the s-polarized light component which has been incident on the polarization beam splitter 10 travels to the third end surface 10c from which the s-polarized light component is output from the first end surface 10a on which the s-polarized light component is incident by a distance of A. The optical path length of the s-polarized light component is n×A.

Therefore, in order to make the optical path length of the s-polarized light component exiting the third end surface 10c equal to the optical path length of the s-polarized light component exiting the fourth end surface 10d, the following configuration is employed. That is, the optical path length adjusting member 13 as the member of which length of one side is A and which has the same refractive index as the refractive index of the polarization beam splitter 10 is bonded to the third end surface 10c. With this configuration, the s-polarized light component incident on the polarization beam splitter 10 travels from the first end surface 10a to the optical path length adjusting member output surface 13a by a distance of 2A and therefore, the optical path length thereof is n×2A. With this, the optical path length thereof can be made to be equal to the optical path length n×2A from the light incident surface to the light output fourth end surface 10d.

In the embodiment, the member having a refractive index which is the same as the refractive index n of the member constituting the polarization beam splitter 10 is used as the optical path length adjusting member 13. However, the invention is not limited thereto and a member having a refractive index which is different from the refractive index n of the member constituting the polarization beam splitter 10 may be used as the optical path length adjusting member 13, for example. In this case, when the refractive index of the optical path length adjusting member 13 is n' which is different from the refractive index n of the polarization beam splitter 10, it is sufficient that a length A' of the optical path length adjusting member 13 is adjusted so as to be a length satisfying the relation of n'×2A'=n×2A.

The transmissivity adjusting filter 14 is bonded to the output surface 13a of the optical path length adjusting member 13. The transmissivity adjusting filter 14 is a light absorption-type filter member which adjusts the intensity of the light component transmitting through the output surface 13a of the optical path length adjusting member 13 so as to make a balance between the intensity of the light component to be output from the fourth end surface 10d and the intensity of the light component transmitting through the output surface 13a. As the transmissivity adjusting filter 14, a configuration obtained by mixing a material which absorbs light to a substrate such as a glass or a configuration obtained by forming an optical thin film on a surface of the substrate may be employed.

With the polarization separation device 1 according to the embodiment, the light that has been incident from the first end surface 10a can be output from the third end surface 10c and the fourth end surface 10d in accordance with polarization azimuths thereof. Further, the polarization components of the incident light can be distributed to the two directions orthogonal to the incident direction. As a result, according to the invention, two video images with different polarization azimuths which are displayed on one display panel can be distributed and provided to the right and left eyes of an observer.

With this, in the invention, the number of parts and the assembly man-hours can be reduced so as to reduce the manufacturing cost, make the internal design easier, and reduce the device in size. In this case, if different video images having parallaxes between the right and left eyes are distributed and provided to the right and left eyes of the observer as the two video images with the different polarization azimuths, stereoscopic display can be also realized.

Further, in the embodiment, the optical path length adjusting member 13 is bonded to the third end surface 10c. Therefore, the optical path lengths of the light components to the forth end surface 10d and to the output surface 13a of the optical path adjusting member 13 can be made equal to each other. In addition, in the embodiment, the transmissivity adjusting filter 14 is provided. Therefore, the intensities of the light components distributed to the two directions can be made equal. As a result, brightness of each of the right and left optical systems can be made equal. This makes it possible to provide video images which can be easily viewed.

Second Embodiment

Next, a head mount display (hereinafter, referred to as HMD) using the polarization separation device 1 having the above-described configuration is described. It is to be noted that in the embodiment, the same reference numerals denote the same constituent components in the above-described first embodiment and the functions and the like thereof are the same unless otherwise specified, and therefore description thereof is omitted.

Figure 2:
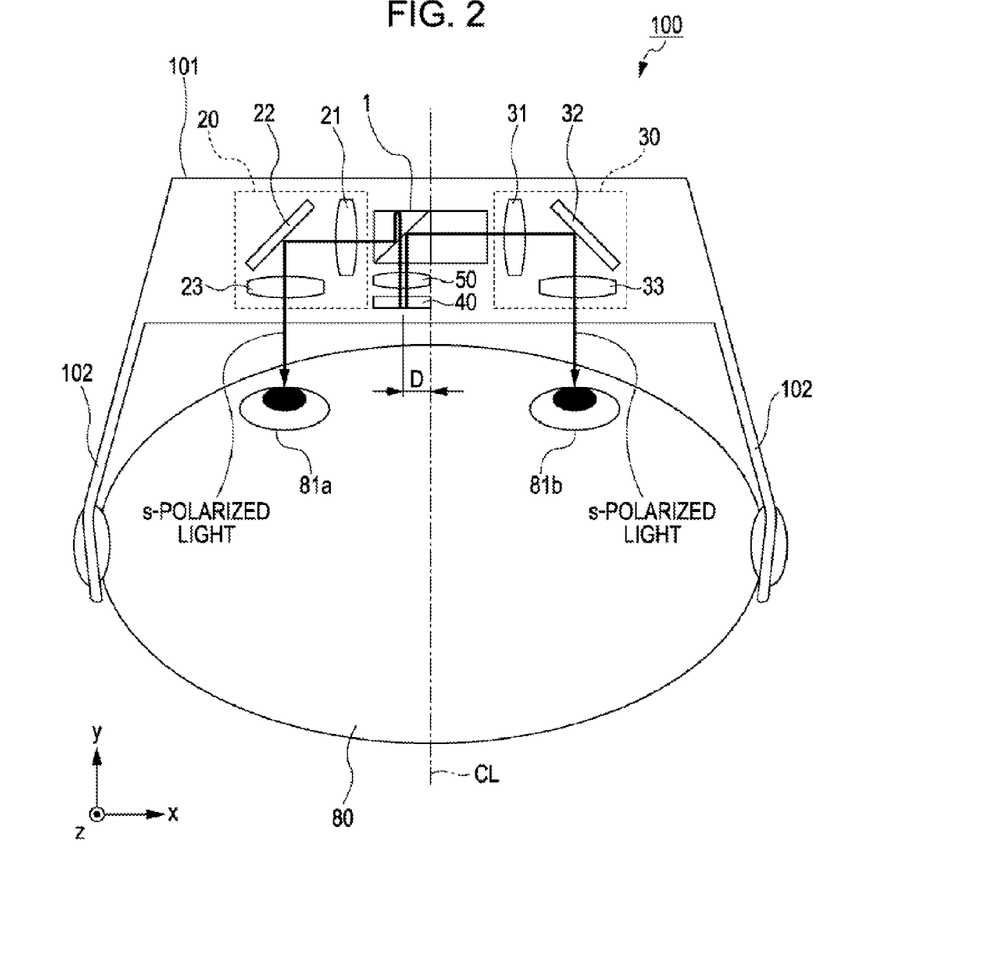
FIG. 2 is a descriptive view illustrating a state where a head mount display is mounted on a head portion of a person when seen from the above according to a second embodiment of the invention.
Figure 3:
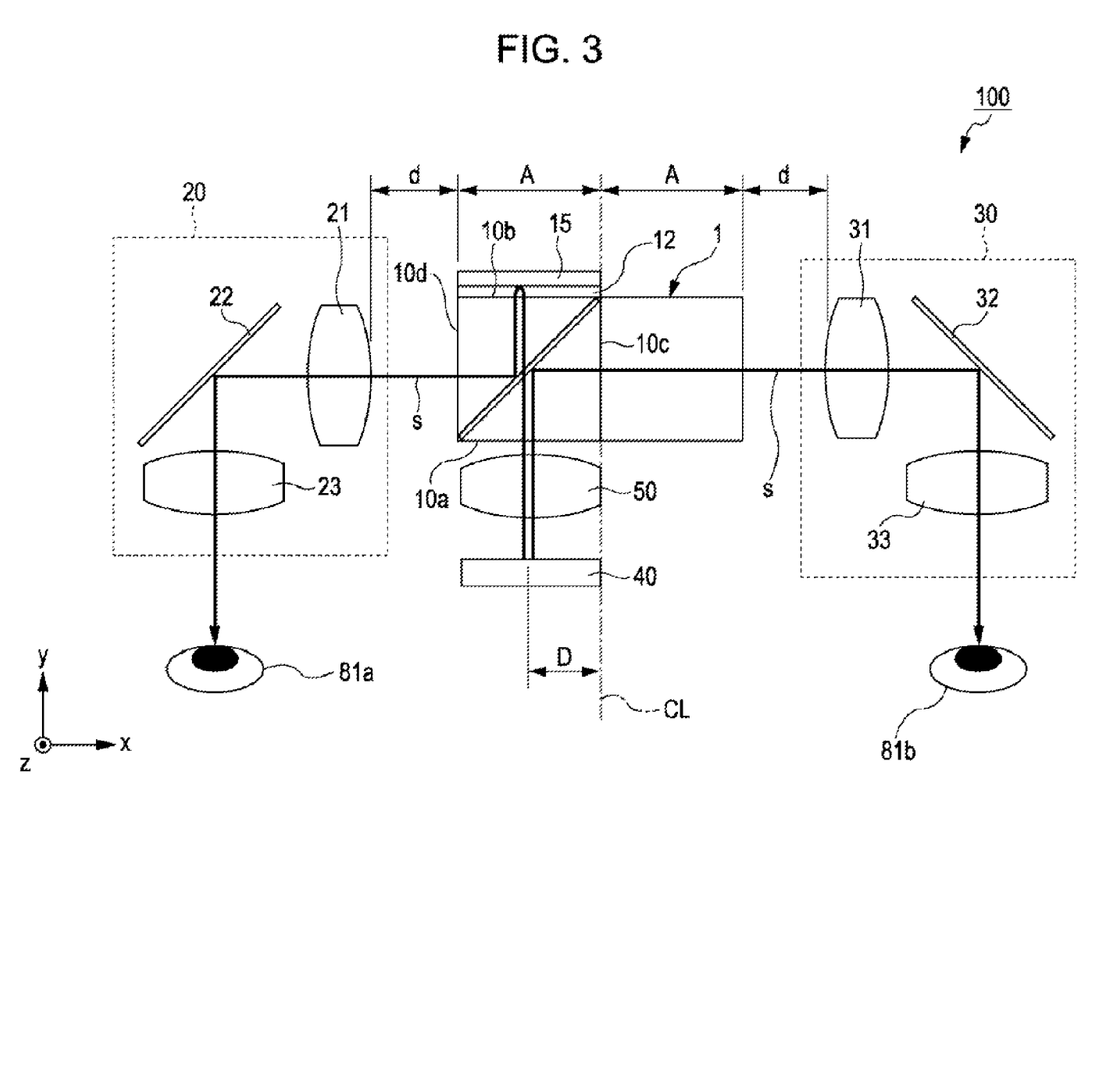
FIG. 3 is a top view schematically illustrating an inner configuration of the head mount display.
Figure 4:
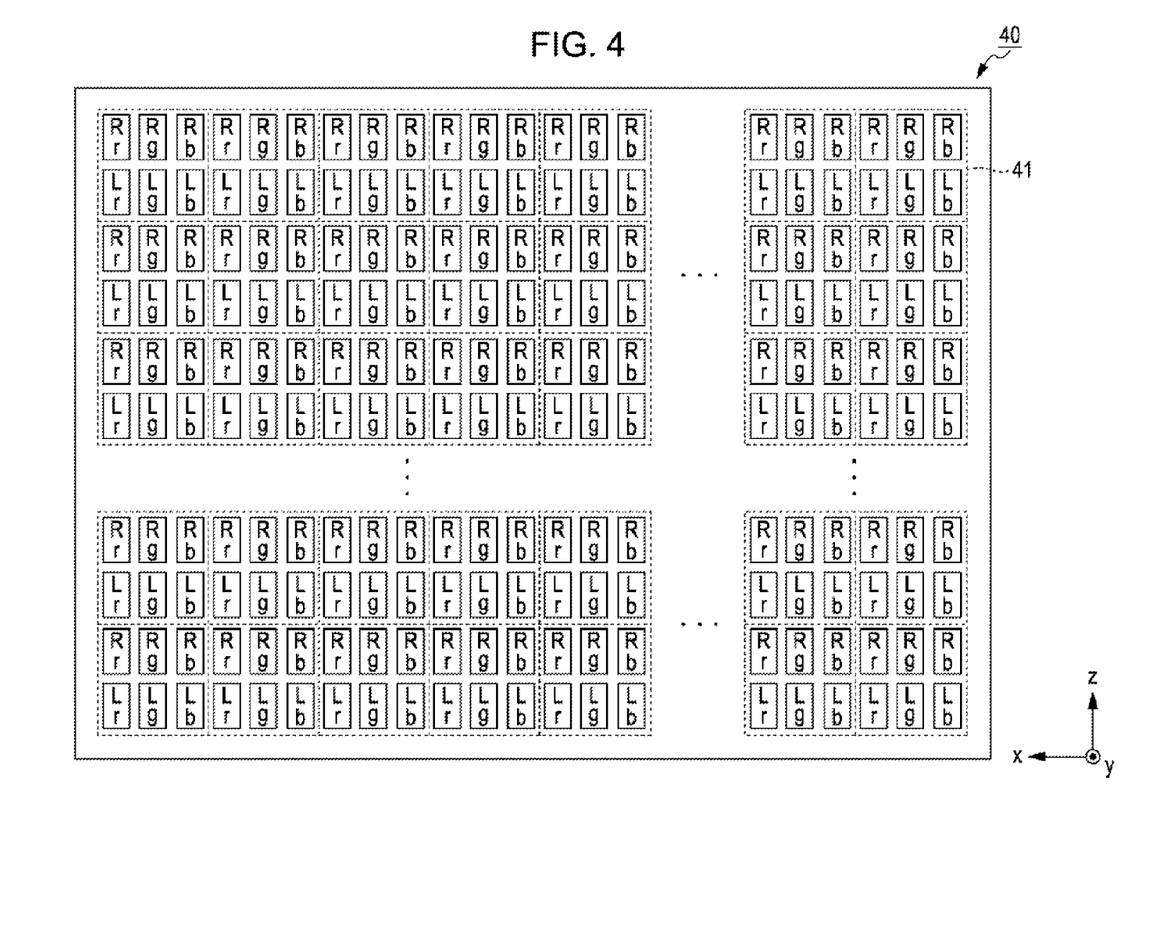
FIG. 4 is a plan view illustrating arrangement of pixels on a display panel.
Figure 5:
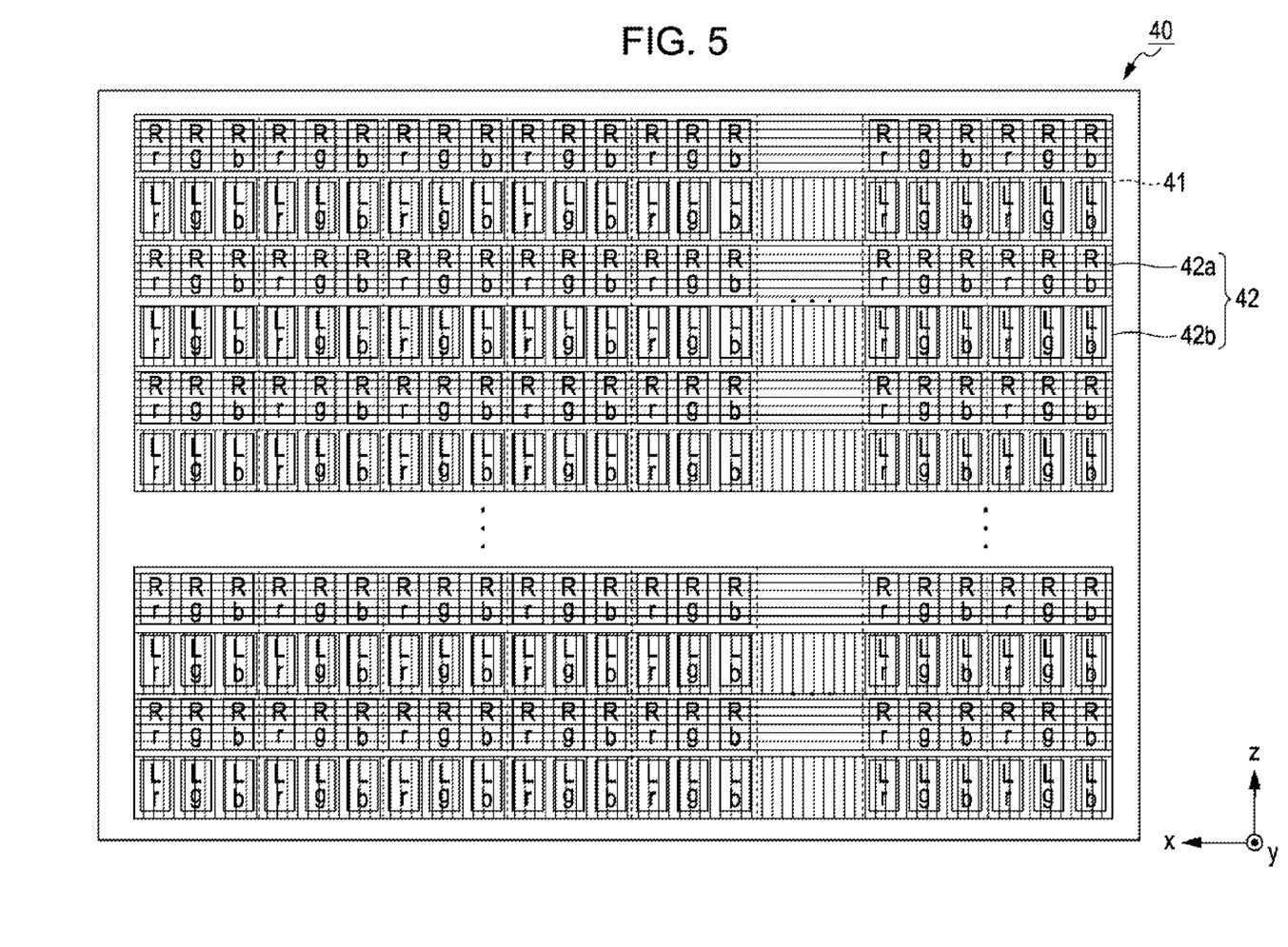
FIG. 5 is a plan view illustrating arrangement of a polarization filter on the display panel.

FIG. 2 is a descriptive view illustrating a state where an HMD 100 is mounted on a head portion 80 of a person when seen from the above according to the embodiment. FIG. 3 is a top view schematically illustrating an inner configuration of the HMD 100 according to the embodiment. FIG. 4 is a plan view illustrating arrangement of pixels on a display panel 40 according to the embodiment. FIG. 5 is a plan view illustrating arrangement of polarization elements on the display panel 40 according to the embodiment.

As illustrated in FIG. 2, the HMD 100 includes at least a pair of mounting portions 102 and 102 and a main body portion 101. The mounting portions 102 and 102 can be mounted on the head portion 80. The main body portion 101 is coupled to the mounting portions 102 and 102 and is arranged in front of both eyes of the person 81. As illustrated in FIG. 2, the mounting portions 102 and 102 are constituted by a pair of temples extending from both ends of the main body portion 101 to the inner sides and make contact with both sides of the head portion so as to fix the HMD 100 to the head portion 80.

The main body portion 101 is a device which displays images and causes the observer to observe the images with both eyes. A housing of the main body portion 101 is arranged in front of both eyes of a user. The display panel 40, a pair of optical systems including a left-eye light guiding optical system 20 and a right-eye light guiding optical system 30, the polarization separation device 1, and a display panel-side lens 50 are included in the housing. It is to be noted that the housing of the main body portion 101 is in a state where the front side thereof is opened or in a state where a transparent member such as a glass is arranged on the front side thereof.

In the embodiment, the polarization separation device 1 is arranged at a substantially center of the housing. The center of the polarization separation device 1 is arranged on a center line CL of the head portion 80. In the embodiment, each side of the polarization beam splitter 10 and the optical path length adjusting member 13, which constitutes the polarization separation device 1, is the same length A respectively. Therefore, as illustrated in FIG. 2 and FIG. 3, a portion on which the polarization beam splitter 10 and the optical path length adjusting member 13 are bonded to each other is positioned on the center line CL of the head portion 80.

The display panel 40 as the display unit and the display panel-side lens 50 are arranged at the side of the head portion 80 of the polarization separation device 1. The display panel 40 is a display unit which makes a video images constituted by both of the p-polarized light component with a predetermined polarization azimuth and the s-polarized light component with a polarization azimuth which is different from the p-polarized light component be incident on the first end surface 10a as the incident light. In the embodiment, an organic EL display is used as the display panel 40. The organic EL display has a configuration in which at least a single-layer organic thin film containing an organic material between a pixel electrode and a counter electrode, for example, and is driven by a driving circuit having an appropriate configuration. Among them, the pixel electrode functions as an anode and the counter electrode functions as a cathode, for example. If a current is made to flow between the pixel electrode and the counter electrode, recombination between electrons and positive holes is generated on the organic thin film. With the recombination, the organic thin film or the organic EL element emits light.

As illustrated in FIG. 2, the display panel 40 as the organic EL display having the above configuration is arranged so as to be eccentric to a left eye 81a with respect to the center line CL of the head portion 80 by a predetermined distance D and outputs the video image light to the front side. In the embodiment, member lengths of the polarization beam splitter 10 and the optical path length adjusting member 13 are equal to each other. Therefore, the distance D is half the length A of the polarization beam splitter 10. Further, the video image light is separated into the right and left sides by the polarization separation device 1 and is guided to the right and left eyes by the left-eye light guiding optical system 20 and the right-eye light guiding optical system 30. Then, the observer can view enlarged virtual images of the video images on the display panel 40 with the right and left eyes.

The arrangement of the pixels constituting the display panel 40 is described with reference to FIG. 4 and FIG. 5. As illustrated in FIG. 4, a number of pixels 41 are arranged on the display panel 40. On each pixel 41, pixels R to be used for generating a video image for the right eye and pixels L to be used for generating a video image for the left eye are alternately arranged along the z-axis direction column by column. Further, each of the pixels R and the pixels L are constituted by pixels displaying red, green, and blue and are arranged so as to be aligned in the x-axis direction, as illustrated in FIG. 4. To be more specific, red pixels r, green pixels g, and blue pixels b are aligned in this order at intervals. One color pixel is formed by three continuous pixel Rr, pixel Rg and pixel Rb, or three continuous pixel Lr, pixel Lg and pixel Lb. That is to say, a set of Rr (red), Rg (green) and Rb (blue) is a pixel unit for generating a color video image for the right eye and a set of Lr (red), Lg (green) and Lb (blue) is a pixel unit for generating a color video image for the left eye.

In addition, as illustrated in FIG. 5, a polarization filter 42 which separates the polarization components contained in the video image is provided on the display panel 40 at the side of the polarization separation device 1. In the embodiment, the polarization filter 42 is a wire grid-type polarization plate on which metal wires (wire) made of aluminum, silver, or chromium are arranged on a transparent substrate in parallel at a constant interval. Further, a wire grid-type polarization filter for the right eye 42a and a wire grid-type polarization filter for the left eye 42b are formed on the polarization filter 42. The polarization filter for the right eye 42a has a pattern with which the s-polarized light component is output to the polarization separation device 1. The polarization filter for the left eye 42b has a pattern with which the p-polarized light component is output to the polarization separation device 1.

As illustrated in FIG. 3, the display panel-side lens 50 is an objective lens for focusing the video image light (s-polarized light component and p-polarized light component) output from the display panel 40. The display panel-side lens 50 is arranged to be substantially in parallel with the display panel 40 and the video image light focused on the display panel-side lens 50 is made to be incident on the polarization separation device 1.

On the other hand, the right-eye light guiding optical system 30 and the left-eye light guiding optical system 20 are provided at both side portions of the polarization separation device 1. As illustrated in FIG. 3, the left-eye light guiding optical system 20 and the right-eye light guiding optical system 30 are arranged so as to be distanced from end surfaces of the polarization separation device 1 by a distance d. To be more specific, as illustrated in FIG. 3, the left-eye light guiding optical system 20 is arranged so as to be distanced from the fourth end surface 10d of the polarization beam splitter 10 by the predetermined distance d. The right-eye light guiding optical system 30 is arranged so as to be distanced from the output surface 13a of the optical path length adjusting member 13 by the predetermined distance d.

The right-eye light guiding optical system 30 is an optical system which enables an observer to observe an enlarged virtual image of the video image output from the third end surface 10c with the right eye. The left-eye light guiding optical system 20 is an optical system which enables the observer to observe an enlarged virtual image of the video image output from the fourth end surface 10d with the left eye. These optical systems project the s-polarized light components separated on the polarization separation device 1 onto the right eye 81b and the left eye 81a.

In the embodiment, the left-eye light guiding optical system 20 and the right-eye light guiding optical system 30 are constituted by the same optical elements and include eyepieces 23 and 33, reflecting mirrors 22 and 32, and relay lenses 21 and 31, respectively.

The relay lenses 21 and 31 are lenses which transmit the video images displayed on the display panel 40 to the eyepieces 23 and 33, respectively. In the embodiment, the relay lenses 21 and 31 are arranged to be substantially in parallel with the third end surface 10c and the fourth end surface 10d of the polarization separation device 1.

The reflecting mirrors 22 and 32 are mirror members which reflect the light components output from the relay lenses 21 and 31 to the directions of the right eye 81b and the left eye 81a, respectively. For example, reflecting films formed with the dielectric multilayer films, aluminum films, silver films, or the like, are formed on the reflecting mirrors 22 and 32. Further, the reflecting mirrors 22 and 32 form angles of approximately 45° with respect to the incident light components and reflecting surfaces thereof are arranged at the side of the head portion 80. The light components which have passed through the relay lenses 21 and 31 are inflected by 90° by the reflecting mirrors 22, 32 and are reflected to the directions of the right eye 81b and the left eye 81a, respectively. It is to be noted that in the embodiment, the reflecting mirrors 22 and 32 are mirrors having no light transmissivity, which reflect irradiated light components.

The eyepieces 23 and 33 are convex lenses which enlarge image light components in accordance with the image information and project them onto the eyes of the observer. The eyepieces 23 and 33 are arranged to be substantially in parallel with the right eye 81b and the left eye 81a. It is to be noted that in the embodiment, the left-eye light guiding optical system 20 and the right-eye light guiding optical system 30 include the eyepieces 23 and 33, the reflecting mirrors 22 and 32, and the relay lenses 21 and 31, respectively. However, the left-eye light guiding optical system 20 and the right-eye light guiding optical system 30 are not limited to have this configuration and various optical systems in which appropriate lens systems are combined can be also applied.

It is to be noted that in the HMD 100 according to the embodiment, when the video images on the display panel 40 are distributed to the right and left sides, video images of which right and left sides of the screen are inverted are provided to the right and left eyes by the polarization separation device 1 and the reflecting mirrors 22 and 32. Therefore, the video images of which right and left sides of the screen are inverted are displayed as the video image for the right eye and the video image for the left eye.

Figure 6A:
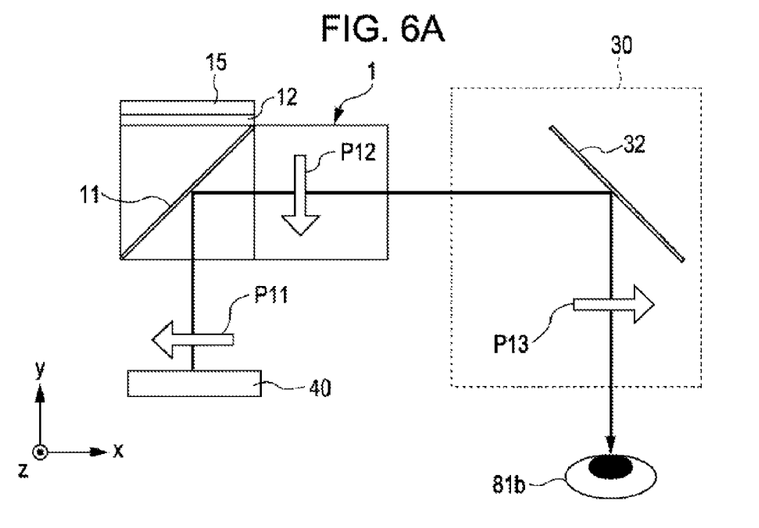
FIG. 6A is a descriptive view illustrating an inverted state of a virtual image of a video image for the right eye on the head mount display.
Figure 6B:
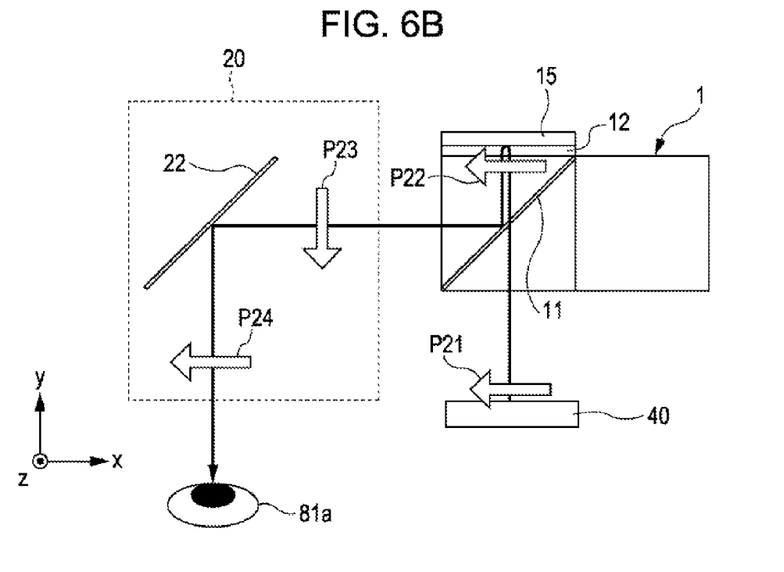
FIG. 6B is a descriptive view illustrating an inverted state of a virtual image of a video image for the left eye on the head mount display.

The inversion of the virtual images on the HMD 100 is described. FIG. 6A is a descriptive view illustrating an inverted state of the virtual image of the video image for the right eye on the HMD 100. FIG. 6B is a descriptive view illustrating an inverted state of the virtual image of the video image for the left eye on the HMD 100. It is to be noted that in the embodiment, since the inversion of the virtual images by the display panel-side lens 50 and the relay lenses 21 and 31 is symmetric, the inversion is not taken into consideration. Only the inversion of the virtual images by the polarization separation device 1 and the reflecting mirrors 22 and 32 is described. Further, in the embodiment, the same video images (video images P11 and P21 of left-pointing arrows) are output from the display panel 40 as the video image for the right eye and the video image for the left eye.

At first, as illustrated in FIG. 6A, the video image for the right eye P11 output from the display panel 40 is reflected by the polarization separation surface 11 of the polarization separation device 1, is rotated by 90°, and is output to the reflecting mirror 32. In this case, a virtual image of a video image for the right eye P12 when seen from the reflecting mirror 32 corresponds to a video image of a left-pointing arrow. Further, the video image for the right eye P12 is reflected by the reflecting mirror 32, is rotated by 90°, and is output to the right eye 81b. In this case, a virtual image of a video image for the right eye P13 when seen from the right eye 81b corresponds to a video image of a right-pointing arrow.

On the other hand, as illustrated in FIG. 6B, the video image for the left eye P21 output from the display panel 40 transmits through the polarization separation surface 11 and is reflected by the metal reflecting film 15. In this case, a virtual image of a video image for the left eye P22 when seen from the polarization separation surface 11 corresponds to a video image of a left-pointing arrow. Thereafter, the video image for the left eye P22 is reflected by the polarization separation surface 11, is rotated by 90°, and is output to the reflecting mirror 22. In this case, a virtual image of a video image for the left eye P23 when seen from the reflecting mirror 22 corresponds to a video image of a right-pointing arrow. Then, a video image for the left eye P23 incident on the reflecting mirror 22 is reflected, is rotated by 90°, and is output to the direction of the left eye 81a. In this case, a virtual image of a video image for the left eye P24 when seen from the left eye 81a corresponds to a video image of a left-pointing arrow.

As described above, even when the same video images (video images P11 and P21 of the left-pointing arrows) are output as the video image for the right eye and the video image for the left eye, the video image P13 of the right-pointing arrow is provided to the right eye and the video image P24 of the left-pointing arrow is provided to the left eye. Accordingly, in the embodiment, when the video images of the display panel 40 are distributed to the right and left sides, video images of which right and left sides of the screen on the display panel 40 are inverted are displayed by the HMD 100 as the video image for the right eye and the video image for the left eye.

As described above, in the embodiment, two video images with different polarization azimuths which are displayed on the display panel 40 are distributed to the two directions by using the polarization separation device 1 according to the first embodiment. The distributed video images can be independently provided to the right and left eyes of an observer through the left-eye light guiding optical system 20 and the right-eye light guiding optical system 30, respectively. In this case, if different video images having parallaxes between the right and left eyes are distributed and provided to the right and left eye of the observer as the two video images with the different polarization azimuths, stereoscopic display can be also realized.

In particular, in the embodiment, the optical path lengths of the light components distributed to the two directions from the light incident surface to the light output surface of the polarization separation device 1 can be made equal to each other. Therefore, as the optical systems for providing the enlarged virtual images of the video images on the display panel to the right and left eyes, the same lens systems and mirrors can be used for the right and left eyes respectively. As a result, the optical systems can be easy to be designed such that aberrations and magnifications are equal on the right and left optical systems. With this, the optical systems can provide video images which are easy to be viewed and common parts can be used therefor. Therefore, the number of parts and the assembly man-hours can be reduced so as to reduce the manufacturing cost.

Further, in the embodiment, the center position of the display panel 40 is eccentric with respect to the center position between both eyes of the observer by the predetermined distance. Therefore, even when the polarization separation device 1 is asymmetric, installation places of the polarization separation device 1 and the right and left optical systems can be ensured without complicating the structure thereof, thereby making design thereof easier. Further, in the embodiment, different images can be provided to the right and left eyes by using only one display panel 40. Therefore, the HMD 100 can be reduced in size and cost. In addition, the pixels for the right eye and the left eye are aligned in the columnar direction, thereby suppressing deterioration of the horizontal resolution.

Third Embodiment

Figure 7:
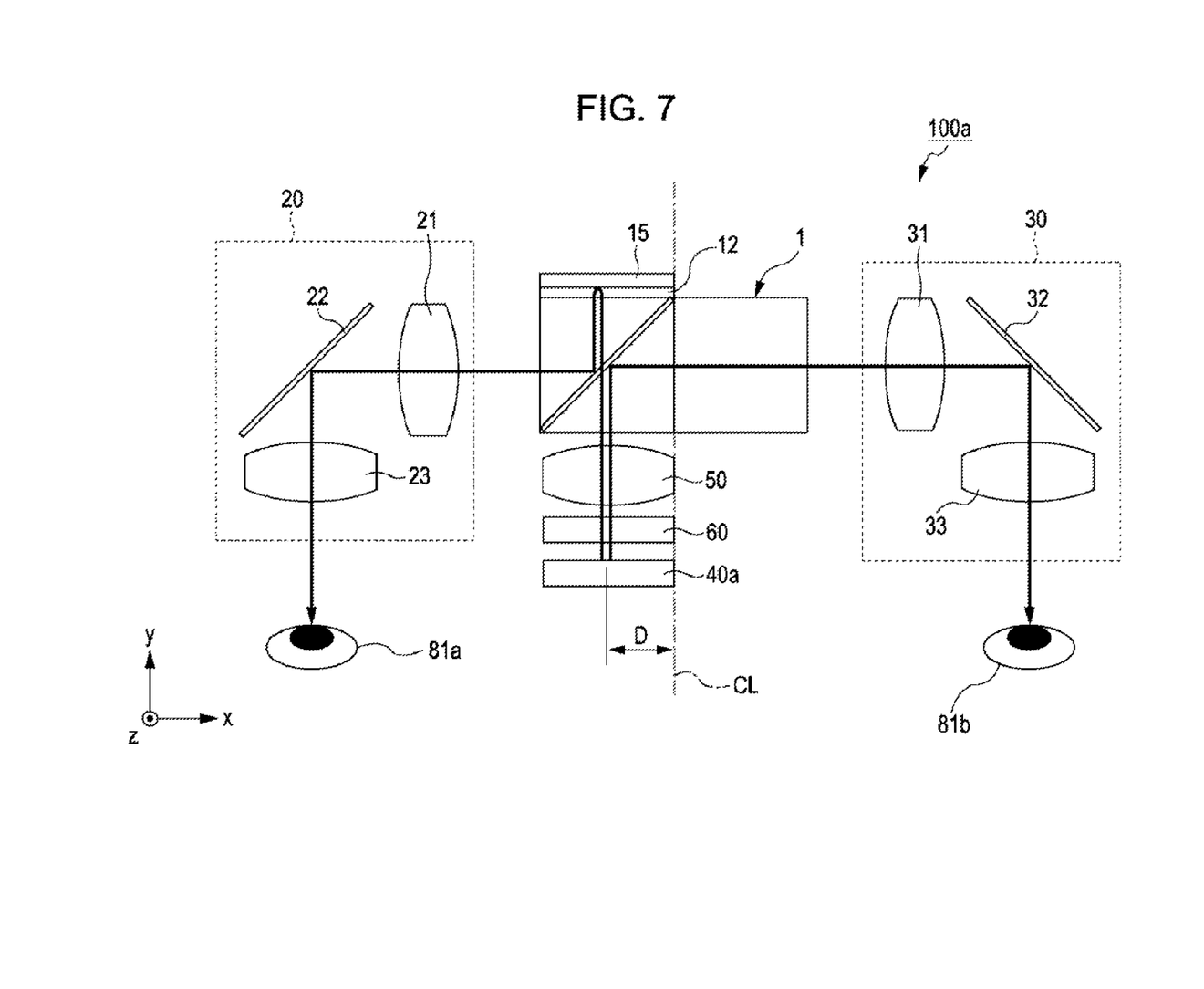
FIG. 7 is a top view schematically illustrating an inner configuration of a head mount display according to a third embodiment of the invention.

FIG. 7 is a top view schematically illustrating an inner configuration of an HMD 100a according to the third embodiment of the invention. The HMD 100a according to the embodiment is different from the HMD 100 in that the display panel 40 is a liquid crystal display. It is to be noted that in the embodiment, the same reference numerals denote the same constituent components in the above-described first embodiment and second embodiment and the functions and the like thereof are the same unless otherwise specified, and therefore description thereof is omitted.

A display panel 40a used in the embodiment is a liquid crystal display which can output a polarization component vibrating in the specified direction by a polarization plate at the output side. The pixel array of the display panel 40a is not a special array described in the first embodiment but is a pixel array of the common liquid crystal display, that is, an array in which pixels formed by dots of red, blue and green are arranged two-dimensionally.

Further, in the embodiment, a polarization plane rotating element 60 is arranged on the front surface side of the display panel 40a. The polarization plane rotating element 60 is a member which switches a polarization azimuth of light which is made to be incident on the polarization separation device 1 to keep as is or rotate the polarization azimuth by 90° with a voltage to be applied to the liquid crystal so as to selectively output a predetermined polarization component only. Ferroelectric liquid crystal (FLC) or antiferroelectric liquid crystal (AFLC) is used as the polarization plane rotating element 60.

In the embodiment, the video image for the left eye and the video image for the right eye are controlled to be displayed in turns by a controller such as a CPU (not illustrated). To be more specific, when the video image for the left eye is being displayed, the controller controls the polarization plane to be a p-polarized light component to the polarization separation device 1 by the polarization plane rotating element 60. On the other hand, when the video image for the right eye is being displayed, the controller controls a polarization plane to be an s-polarized light component to the polarization separation device 1 by the polarization plane rotating element 60. In this manner, video images which are switched temporally are provided to the right and left eyes so that different video image are provided to the right and left eyes.

According to the embodiment, even when the common liquid crystal display is used, the optical path lengths of the light components distributed to the two directions from the light incident surface to the light output surface of the polarization separation device 1 can be made equal to each other. Further, in the optical systems for providing the enlarged virtual images of the images on the display panel to the right and left eyes, the same lens systems and mirrors can be used for the right and left eyes. As a result, the optical systems can be easy to be designed such that aberrations and magnifications are equal on the right and left optical systems. With this, the optical systems can provide video images which are easy to be viewed and common parts can be used therefor. Accordingly, the number of parts and the assembly man-hours can be reduced so as to reduce the manufacturing cost.

Variations

Figure 8:
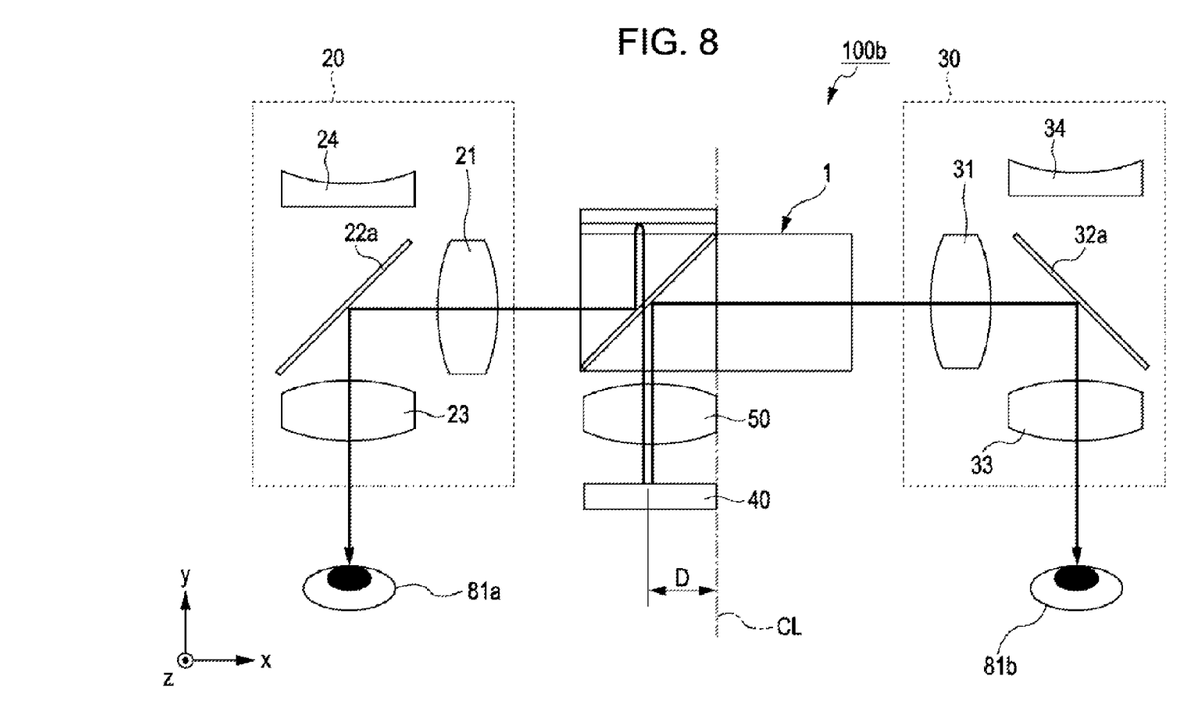
FIG. 8 is a top view schematically illustrating an inner configuration of a head mount display according to a variation of the invention.

It is to be noted that the description of the above-described embodiments are only examples of the invention. Therefore, the invention is not limited to the above-described embodiments. It is needless to say that various changes can be made in accordance with design and the like in a range without departing from the technical spirit of the invention. FIG. 8 is a horizontal cross-sectional view illustrating a head mount display 100b according to the variation of the invention. It is to be noted that in the variation, the same reference numerals denote the same constituent components in the above-described embodiments and the functions and the like thereof are the same unless otherwise specified, and therefore description thereof is omitted.

For example, in the above-described second and third embodiments, mirror members having no transmissivity are used as the reflecting mirrors 22 and 32 on the left-eye light guiding optical system 20 and the right-eye light guiding optical system 30. However, the invention is not limited thereto. For example, as illustrated in FIG. 8, the mirror members can be also replaced by half mirrors 22a and 32a so as to constitute the see-through-type HMD 100b.

In this case, concave lenses 24 and 34 cancelling the refractive forces by the eyepieces are arranged on the HMD 100b at the opposite side to the eyepieces 23 and 33 with respect to the half mirrors 22a and 32a, respectively. With this configuration, light components incident from the outside pass through the concave lenses 24 and 34 and the eyepieces 23 and 33 respectively. This makes it possible to reduce distortion of the external field to be provided to the eyes so that an observer is easy to view the external field.

Further, for example, in the above-described second and third embodiments, the HMD 100 has the configuration in which the distance d from the fourth end surface 10d of the polarization beam splitter 10 to the left-eye light guiding optical system 20 for the left eye and the distance d from the output surface 13a of the optical path length adjusting member 13 to the right-eye light guiding optical system 30 for the right eye are equal to each other. Further, the HMD 100 has the configuration in which the center line of the display panel 40 is eccentric from the center line CL between both eyes by the predetermined distance D. However, the invention is not limited to this configuration. A configuration in which the refractive index of the optical path length adjusting member 13 is set to a refractive index which is different from the refractive index of the polarization beam splitter 10 and the length of the optical path length adjusting member 13 is adjusted so as to position the center position of the display panel 40 on the center line CL between both eyes may be employed.

Figure 9:
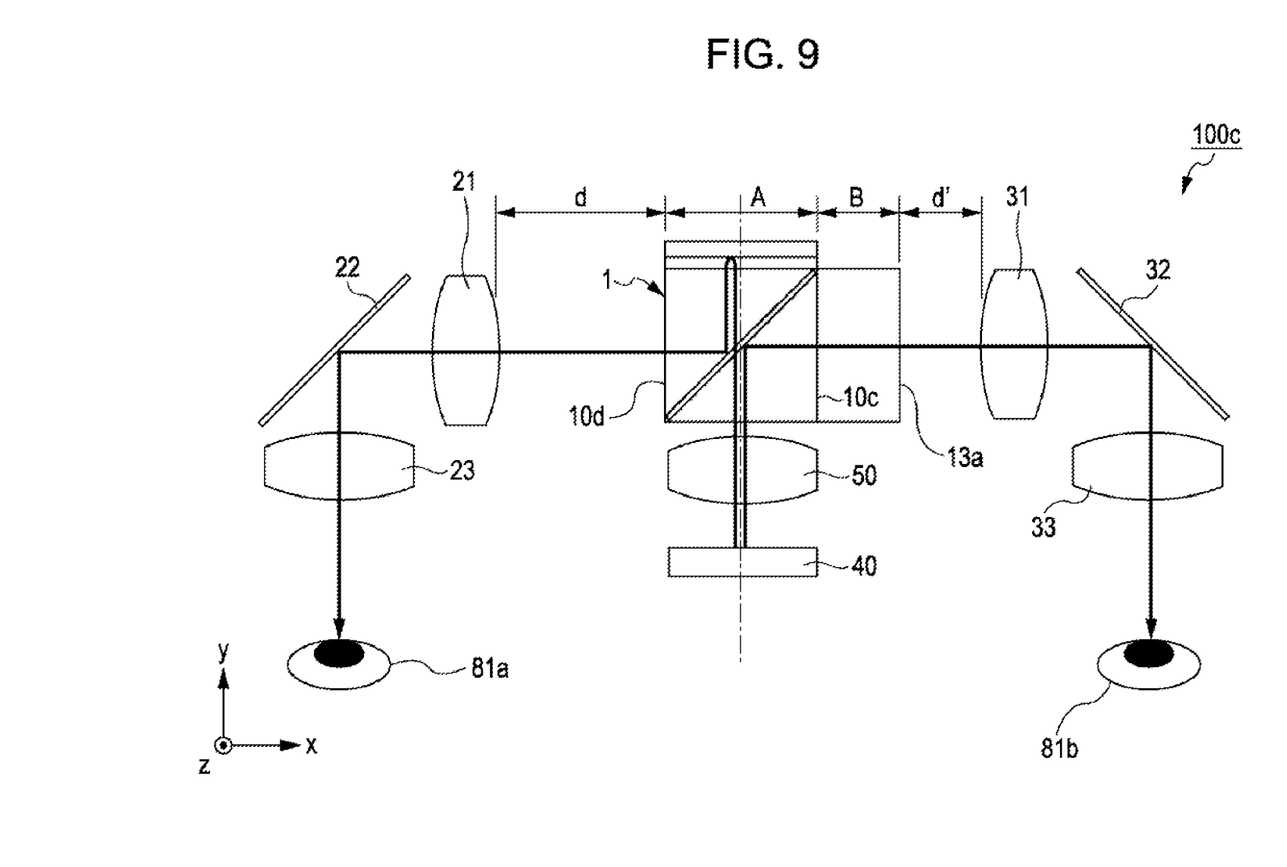
FIG. 9 is a top view schematically illustrating an inner configuration of a head mount display according to another variation of the invention.

To be more specific, as illustrated in FIG. 9, the refractive index of the polarization beam splitter 10 is assumed to be n and the length of each side of the polarization beam splitter 10 is assumed to be A. Further, the refractive index of the optical path length adjusting member 13 is assumed to be n' which is different from the refractive index of the polarization beam splitter 10 and the length of the side of the optical path length adjusting member 13 through which the light passes is assumed to be B. In addition, a distance from the fourth end surface 10d to the relay lens 21 is assumed to be d and a distance from the output surface 13a of the optical path length adjusting member 13 to the relay lens 31 is assumed to be a distance d'.

In this case, the p-polarized light component incident on the polarization beam splitter 10 travels on the optical path from the first end surface 10a on which the p-polarized light component is incident to the fourth end surface 10d from which the p-polarized light component is output by the distance 2A with the refractive index n. Thereafter, the p-polarized light component travels from the fourth end surface 10d to the relay lens 21 with no refractive index. Therefore, the optical path length of the p-polarized light component to the relay lens 21 is n×2A+d.

On the other hand, the s-polarized light component incident on the polarization beam splitter 10 travels on the optical path from the first end surface 10a on which the s-polarized light component is incident to the third end surface 10c from which the s-polarized light component is output by the distance A with the refractive index n. Thereafter, the s-polarized light component travels on the optical path length adjusting member 13 by the length B with the refractive index n'. Further, the s-polarized light component travels from the output surface 13a of the optical path length adjusting member 13 to the relay lens 31 by the length d' with no refractive index. Therefore, the optical path length of the s-polarized light component is n×A+n'×B+d'. When the two optical path lengths are equal, a relation of n×2A+d=n×A+n'×B+d' is satisfied.

In order to position the center position of the display panel 40 on the center line CL between both eyes, a relation of d=B+d' is required to be satisfied. Therefore, if d'=d−B is substituted into the above-described equation, a relation of n×A+d=n'×B+d−B is satisfied.

As the equation is rearranged, n×A=n'×B−B, that is, n×A=B(n'−1) is satisfied so that a relation of B=(n×A)/(n'−1) is satisfied.

Accordingly, if the length B of the optical path length adjusting member 13 and the refractive index n' having the above relationship are used, the center position of the display panel 40 can be arranged on the center line CL between both eyes.

Further, in the above-described embodiments, the polarization beam splitter 10 is formed with the glasses having the same refractive index. Further, the optical path length adjusting member 13 is formed with the glass having the refractive index which is the same as the polarization beam splitter 10. With this, the refractive index of the polarization beam splitter 10 and the refractive index of the optical path length adjusting member 13 are made the same. However, the invention is not limited thereto. It is sufficient that the optical path lengths of the separated two s-polarized light components are equal to each other. For example, in the polarization beam splitter 10, the prism part 10L from the polarization separation surface 11 to the second end surface 10b may be formed by the same member as the optical path length adjusting member 13 and the prism part 10R as another part may be formed by a member which is different from the optical path length adjusting member 13.

In this case, the refractive indices of the prism part 10L of the polarization beam splitter 10 and the optical path length adjusting member 13 are assumed to be n' which is different from the refractive index n of the glass constituting the prism part 10R. Further, the length of the optical path length adjusting member 13 is assumed to be C. Under the assumption, the optical path length of the light component which is incident from the first end surface (incident surface) 10a of the polarization beam splitter 10, is reflected by the polarization separation surface 11, and reach the exit (output surface) 13a of the optical path length adjusting glass is n×A+n'×C. On the other hand, the optical path length of the light component which is incident from the first end surface (incident surface) 10a of the polarization beam splitter, transmits through the polarization separation surface 11, is reflected by the metal reflecting film 15, is reflected by the polarization separation surface 11, and reaches the fourth end surface 10d of the polarization beam splitter is n×(A/2)+n'×(3A/2). If the optical path lengths obtained by these equations are equal to each other, it is sufficient that the length C of the optical path length adjusting member 13 is set to a length satisfying n'×C=(A/2)×(3n'−n).

According to the variation, the prism part 10L from the polarization separation surface 11 to the second end surface 10b and the optical path length adjusting member 13 are formed by the same member. Therefore, the optical path lengths of the light components distributed to the two directions on the polarization separation device 1 from the light incident surface to the light output surface of the polarization separation device 1 can be made equal to each other easily. Accordingly, the optical systems can be easily designed and raw materials can be procured easily so as to reduce the manufacturing cost.

Further, in the above-described embodiments, the array of the pixels on the display panel 40 in the invention is not limited thereto. It is sufficient that the pixels R for the right eye and the pixels L for the left eye are arranged uniformly in a dispersed manner. Various patterns such as a pattern in the lateral direction, an oblique direction pattern, and check pattern may be used.

In addition, in the above-described second embodiment and third embodiment, the polarization beam splitter 10 and the optical path length adjusting member 13 are bonded to each other. However, the invention is not limited thereto. For example, the polarization beam splitter 10 and the optical path length adjusting member 13 may be integrated with the same material by integral molding. In this case, fluctuation in the refractive index and the like generated between the third end surface 10c of the polarization beam splitter 10 and the incident surface 13b of the optical path length adjusting member 13 which are bonded to each other can be reduced. Further, the number of overall parts of the polarization separation device 1 can be reduced, thereby reducing the cost further.

Further, in the above-described second embodiment and third embodiment, the display panel 40 is arranged at the side of the person on which the HMD 100 is mounted and outputs video image light to the outer side. However, the invention is not limited to the configuration. A configuration in which the display panel 40 is arranged at the outer side of the HMD 100 and outputs the video image light to the side of the person on which the HMD 100 is mounted may be employed.

The entire disclosure of Japanese Patent Application No. 2011-259917, filed Nov. 29, 2011 is expressly incorporated by reference herein.

What is claimed is:

1. A polarization separation device comprising:
   a first end surface on which incident light is incident;
   a polarization separation surface that reflects an s-polarized light component and transmits a p-polarized light component;
   a second end surface that is arranged to be opposed to the first end surface, converts the p-polarized light component transmitted through the polarization separation surface to the s-polarized light component, and reflects the converted light component to an optical axis direction which is the same as the incident light;
   a third end surface from which the s-polarized light component reflected by the polarization separation surface without transmitting through the polarization separation surface is output,
   a fourth end surface that is arranged to be opposed to the third end surface and from which the s-polarized light component reflected by the second end surface and the polarization separation surface is output, and
   an optical path length adjusting member that converts an optical path length of light transmitted through the third end surface,
   wherein a member from the first end surface to the polarization separation surface, a member from the polarization separation surface to the second end surface, and the optical path length adjusting member are formed by the same member, and a length of the optical path adjusting member in an optical axis direction is twice a distance from the polarization separation surface to the second end surface.

2. The polarization separation device according to claim 1, wherein a member from the polarization separation surface to the third end surface is formed integrally with the optical path length adjusting member.

3. The polarization separation device according to claim 1, further including a transmissivity adjusting filter that changes transmissivity of light to be output from the optical path adjusting member.

4. The polarization separation device according to claim 1, wherein an optical path length of light which transmits through the polarization separation surface, is reflected by the second end surface and the polarization separation surface, and reaches the fourth end surface and an optical path length of light which is reflected by the polarization separation surface, transmits through the optical path adjusting member, and reaches an output surface are equal to each other.

5. A display apparatus comprising:
   a polarization separation device comprising:
      a first end surface on which incident light is incident;
      a polarization separation surface that reflects an s-polarized light component and transmits a p-polarized light component;
      a second end surface that is arranged to be opposed to the first end surface, converts the p-polarized light component transmitted through the polarization separation surface to the s-polarized light component, and reflects the converted light component to an optical axis direction which is the same as the incident light;
      a third end surface from which the s-polarized light component reflected by the polarization separation surface without transmitting through the polarization separation surface is output,
      a fourth end surface that is arranged to be opposed to the third end surface and from which the s-polarized light component reflected by the second end surface and the polarization separation surface is output;
   a display unit that makes a video image constituted by any one or both of a p-polarized light component and an s-polarized light component incident on the first end surface as the incident light; and a left-eye light guiding optical system and a right-eye light guiding optical system that enable an observer to observe enlarged virtual images of video images output from the third and fourth end surfaces with right and left eyes, respectively.

6. A display apparatus according to claim 5, further including an optical path length adjusting member that converts an optical path length of light transmitted through the third end surface.

7. A display apparatus according to claim 6,
wherein a member from the polarization separation surface to the third end surface is formed integrally with the optical path length adjusting member.

8. A display apparatus according to claim 6, further including a transmissivity adjusting filter that changes transmissivity of light to be output from the optical path adjusting member.

9. A display apparatus according to claim 6,
wherein an optical path length of light which transmits through the polarization separation surface, is reflected by the second end surface and the polarization separation surface, and reaches the fourth end surface and an optical path length of light which is reflected by the polarization separation surface, transmits through the optical path adjusting member, and reaches an output surface are equal to each other.

10. A display apparatus according to claim 6,
wherein a member from the first end surface to the polarization separation surface, a member from the polarization separation surface to the second end surface, and the optical path length adjusting member are formed by the same member, and a length of the optical path adjusting member in an optical axis direction is twice a distance from the polarization separation surface to the second end surface.

11. The display apparatus according to claim 10,
wherein the left-eye light guiding optical system and the right-eye light guiding optical system are constituted by the same optical elements.

12. The display apparatus according to claim 10,
wherein a center position of the display unit is eccentric with respect to a center position between both of the eyes of the observer.

13. The display apparatus according to claim 5,
wherein the left-eye light guiding optical system and the right-eye light guiding optical system are constituted by the same optical elements.

14. The display apparatus according to claim 5,
wherein a center position of the display unit is eccentric with respect to a center position between both of the eyes of the observer.

* * * * *